United States Patent
Gaonkar et al.

(10) Patent No.: US 8,990,395 B2
(45) Date of Patent: Mar. 24, 2015

(54) CONTROLLING ACCESS TO MANAGED OBJECTS IN NETWORKED DEVICES

(71) Applicant: Cisco Technology, Inc., San Jose, CA (US)

(72) Inventors: Vinay Gaonkar, Milpitas, CA (US); Keith McCloghrie, Pawling, NY (US); Sanjeev Chidambar Joshi, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 28 days.

(21) Appl. No.: 13/942,731

(22) Filed: Jul. 16, 2013

(65) Prior Publication Data

US 2013/0304920 A1    Nov. 14, 2013

Related U.S. Application Data (60) Division of application No. 12/833,201, filed on Jul. 9, 2010, now Pat. No. 8,489,723, which is a continuation of application No. 11/107,500, filed on Apr. 15, 2005, now Pat. No. 7,769,859.

(51) Int. Cl.
*G06F 15/173* (2006.01)
*H04L 29/08* (2006.01)
*H04L 12/24* (2006.01)
*H04L 9/08* (2006.01)

(52) U.S. Cl.
CPC ....... *H04L 29/08144* (2013.01); *H04L 12/2403* (2013.01); *H04L 9/088* (2013.01); *H04L 41/0253* (2013.01); *H04L 12/2461* (2013.01); *H04L 12/2486* (2013.01); *H04L 41/0213* (2013.01); *H04L 41/28* (2013.01)

USPC .......................... 709/225; 709/203; 709/229

(58) Field of Classification Search
USPC .................................................. 709/223, 225
See application file for complete search history.

(56) References Cited

U.S. PATENT DOCUMENTS

| | | | |
|---|---|---|---|
| 5,509,123 A * | 4/1996 | Dobbins et al. ............... | 709/243 |
| 5,961,594 A | 10/1999 | Bouvier et al. | |
| 5,999,978 A | 12/1999 | Angal et al. | |
| 6,038,563 A | 3/2000 | Bapat et al. | |
| 6,195,097 B1 | 2/2001 | Shrader et al. | |
| 6,236,996 B1 | 5/2001 | Bapat et al. | |
| 6,385,172 B1 | 5/2002 | Kataria et al. | |
| 6,519,635 B1 | 2/2003 | Champlin et al. | |

(Continued)

OTHER PUBLICATIONS

Wijnen, B., McCloghrie, K.; RFC 3415—View-based Access Control Model (VACM) for the Simple Network Management Protocol (SNMP); Dec. 2002; http://www.faqs.org/rfcs/rfc3415.html.

(Continued)

*Primary Examiner* — Michael Y Won
(74) *Attorney, Agent, or Firm* — Merchant & Gould (57) ABSTRACT

Controlling access to managed objects associated with a networked device. A method comprises receiving a request from a principal for access to a managed object associated with the networked device. The managed objects are accessible based on membership in access groups that are compliant with a Simple Network Management Protocol (SNMP). A first and a second of the access groups associated with the principal are determined. Access privileges for the principal are determined, based on the first and the second access groups. Access to the managed object is granted if permitted based on the access privileges for the principal.

6 Claims, 5 Drawing Sheets

(56) References Cited

U.S. PATENT DOCUMENTS

| | | | |
|---|---|---|---|
| 6,532,491 | B1 | 3/2003 | Lakis et al. |
| 6,724,408 | B1 | 4/2004 | Chen et al. |
| 7,010,780 | B2 | 3/2006 | Perycz et al. |
| 7,039,724 | B1 | 5/2006 | Lavian et al. |
| 7,076,540 | B2 | 7/2006 | Kurose et al. |
| 7,099,947 | B1 | 8/2006 | Nadeau et al. |
| 7,225,244 | B2 | 5/2007 | Reynolds et al. |
| 7,260,621 | B1 | 8/2007 | Lavian et al. |
| 7,290,142 | B1 * | 10/2007 | Yost .............................. 713/171 |
| 7,293,052 | B1 | 11/2007 | Kavasseri |
| 7,313,631 | B1 | 12/2007 | Sesmun et al. |
| 7,356,601 | B1 | 4/2008 | Clymer et al. |
| 7,480,934 | B2 | 1/2009 | Chan et al. |
| 7,594,170 | B2 | 9/2009 | Snover et al. |
| 7,698,359 | B2 | 4/2010 | Wray et al. |
| 7,769,859 | B1 | 8/2010 | Gaonkar et al. |
| 8,489,723 | B2 | 7/2013 | Gaonkar et al. |
| 2002/0124064 | A1 | 9/2002 | Epstein et al. |
| 2002/0184409 | A1 | 12/2002 | Broussard |
| 2003/0126195 | A1 | 7/2003 | Reynolds et al. |
| 2004/0003112 | A1 | 1/2004 | Alles et al. |
| 2004/0041833 | A1 | 3/2004 | Dikhit |
| 2004/0054569 | A1 | 3/2004 | Pombo et al. |
| 2005/0088449 | A1 | 4/2005 | Blanco et al. |
| 2005/0097440 | A1 | 5/2005 | Lusk et al. |
| 2005/0195660 | A1 | 9/2005 | Kavuri et al. |
| 2007/0234228 | A1 | 10/2007 | Rao et al. |
| 2010/0299429 | A1 | 11/2010 | Gaonkar et al. |

OTHER PUBLICATIONS

Harrington, D., Preshun., R., Wijnen, B.; RFC 3411—An Architecture for Describing Simple Network Management Protocol (SNMP) Management Frameworks; Dec. 2002; http://www.faqs.org/rfcs/rfc3411.html.

Harrington, D., Preshun., R., Wijnen, B.; RFC 2571—An Architecture for Describing (SNMP Management Frameworks); Apr. 1999; http://www.faqs.org/rfcs/rfc2571.html.

Wijnen, B.; Preshun, R., McCloghrie, K.; RFC 2575—View-based Access Control Model (VACM) for the Simple Network Management Protocol (SNMP); Apr. 1999; http://www.faqs.org/rfcs/rfc2575.html.

Extending Network Security with Cisco IOS Software Release 12.3(7)T. Cisco Systems. Mar. 2004, p. 12.

Cisco IOS Configuration Fundamentals and Network Management Command Reference, Release 12.3 T, Cisco Systems, p. CFR-511.

Special Edition Using Microsoft Access 2000 by Riger Jennings Publisher: Que. Pub. Date: May 5, 1999.

B. Wijnen et al., "View-based Access Control Model (VACM) for the Simple Network Management Protocol (SNMP)," Network Working Group, Request for Comments: 3415. Copyright the Internet Society Dec. 2002. Downloaded http://www.rfc-editor.org/rfc/rfc3415.txt, Aug. 31, 2010.

Bjørnar Brekka and Flemming Kramer in "Role-Based Access Control for Wireless Information Systems," Agder University College, Grimstad, Jun. 2004.

* cited by examiner

CONTROLLING ACCESS TO MANAGED OBJECTS IN NETWORKED DEVICES

RELATED APPLICATION

This application is a Divisional of U.S. application Ser. No. 12/833,201 entitled "Controlling Access to Managed Objects in Networked Devices" filed Jul. 9, 2010, which issued on Jul. 16, 2013 as U.S. Pat. No. 8,489,723, which application is a Continuation of co-pending U.S. application Ser. No. 11/107, 500 entitled "Controlling Access to Managed Objects in Networked Devices" filed Apr. 15, 2005, which issued on Aug. 3, 2010 as U.S. Pat. No. 7,769,859, which are incorporated herein by reference.

FIELD OF THE INVENTION

Embodiments of the present invention relate to managing devices coupled to a network. More specifically, embodiments of the present invention relate to a method, system, and apparatus for controlling access to managed objects associated with networked devices.

BACKGROUND

Figure 1:
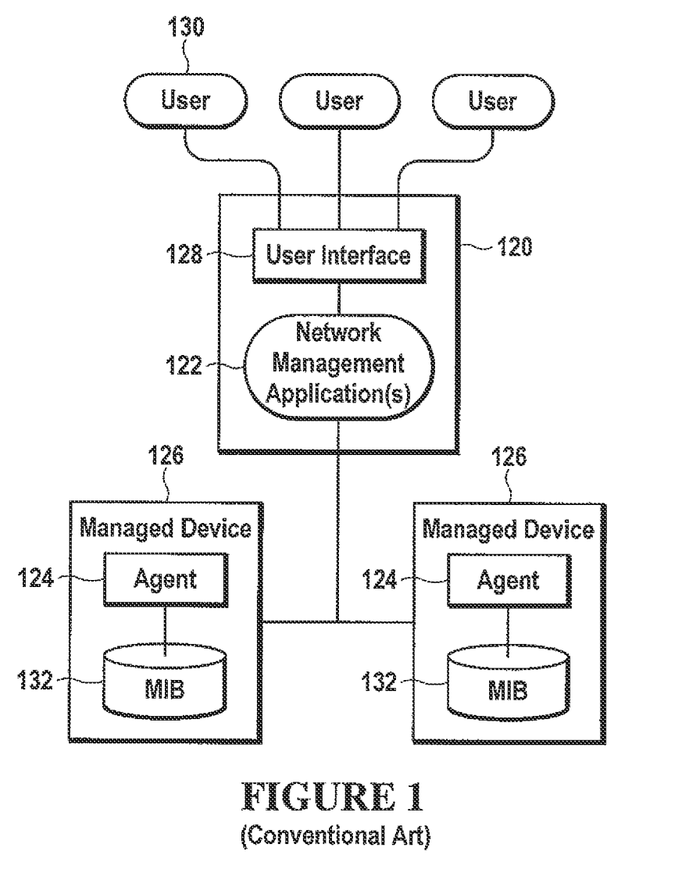
FIG. 1 illustrates a network management station communicating with agents in managed devices via a conventional SNMP protocol.

Simple Network Protocol Management (SNMP) provides a simple protocol for managing devices in a network. FIG. 1 illustrates a network management station 120 communicating with agents 124 in managed devices 126 via an SNMP protocol. The network management station 120 executes network management applications 122 that monitor and control the managed devices 126. The interface 128 allows users 130, such as network administrators, to access the network management station 120.

The managed devices 126 have agents 124, which are typically software modules that collect and store management information and provide an interface between the network management station 120 and the managed device(s) 126. The network management station 120 and the agents 124 communicate via a simple set of commands and employ a Management Information Sase (MIS) 132. A MIS 132 describes various managed objects associated with its managed device 126. To retrieve or modify information, the network management station 120 sends a request to the managed device 126, identifying a managed object in the MIS 132.

Principals may make requests to access the managed objects via the network management station. A principal may be a user acting in a particular role, a set of users each acting in a particular role, an application, a set of applications, or a combination of these. SNMP has an access control mechanism that controls the access privileges a principal has to managed objects. For example, one principal may only have read access to certain managed objects, while another principal may have read/write access to those managed objects. Furthermore, access control may be used in connection with SNMP notification messages.

SNMP has a specification for an engine that comprises an access control subsystem that checks whether a specific type of access (e.g., read, write, notify) to a particular managed object (instance) is allowed. The access control subsystem may use an access control model that specifies sets of access control rules that pertain to respective groups of principals. In the SNMP viewbased access control model (VACM), a group is a set of principals that have certain access privileges to managed objects. In an SNMP view-based access control model, the combination of a securityModel and a securityName maps to at most one group. A securityName is the principal on whose behalf access is requested and a security-Model is a security model under which access is requested. Some SNMP access control models are known as "view-based." However, other than "view-based" models are contemplated.

The relative simplicity of SNMP has led to its proliferation. However, SNMP's simplicity constrains its flexibility and functionality. For example, an ultimate determination of access to a managed object may involve additional factors to those already discussed, including: securityLevel (Level of Security under which access is requested), viewType (view to be checked (read, write or notify)), contextName (context in which access is requested), and variableName (object instance to which access is requested). Because many factors are involved in determining access to a managed object in a networked device, it would be possible for complexity to increase greatly if individual portions of the overall process are made even slightly more complex. Moreover, it is difficult to foresee where a benefit of adding complexity to the process may outweigh a cost of the added complexity.

Therefore, it would be desirable to have a method and system for management of networked devices that is simple and flexible. It would be advantageous if this method and system were compatible with an SNMP protocol.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to various embodiments of the invention, examples of which are illustrated in the accompanying drawings. While the invention will be described in conjunction with various embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, wellknown methods, procedures, components, structures and devices have not been described in detail so as to avoid unnecessarily obscuring aspects of the present invention.

Figure 2:
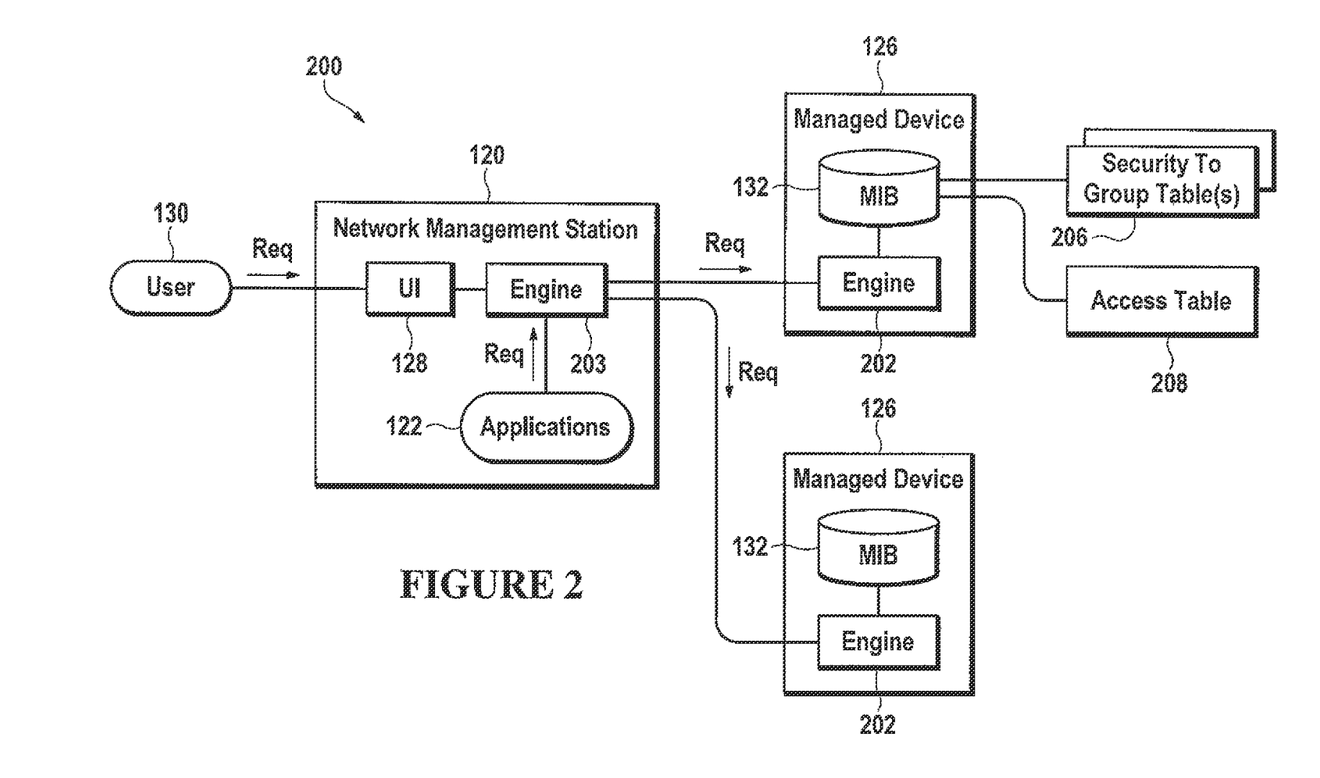
FIG. 2 illustrates a network in accordance with an embodiment of the present invention.

FIG. 2 illustrates a network 200 in accordance with an embodiment of the present invention. The network management station 120 receives requests from a principal (e.g., user 130, application 122) for access to managed objects associated with one of the managed devices 126. Each principal is a part of at least one group that defines access privileges to managed objects. A principal's access privileges are defined by the union of the privileges of all groups to which a principal belongs, in one embodiment. However, the principal's access privileges may be defined by other than the union of the privileges of all groups to which a principal belongs.

Each managed device 126 has a management information base (MIS) 132 defining managed objects. In one embodiment, the managed objects are accessible based on membership in access groups that are compliant with a Simple Network Management Protocol (SNMP). Each access group defines a set of access privileges accorded to the principals in the group. In one embodiment, if a principal is a member of any SNMP group that has access privileges to the managed object, it is allowed access. Each managed device 126 also has an engine 202 for controlling access to the managed objects. The engine 202 enforces a set of rules for accessing the managed objects. The rules comprise a rule in which a principal name is allowed to belong to more than one access group. The managed device may be a router, switch, etc.

The network 200 has a network management station 120 communicatively coupled to the managed devices 126, wherein the network management station 120 is operable to send requests to the managed devices 126 for access to the managed objects. In this fashion, the network management station 120 may be used to view and configure parameters associated with the managed devices 126.

In one embodiment, one of the applications 122 is a command generator application that initiates a request to add or delete a security name (or principal name) to or from a group. In this fashion, one or more of the security to group tables 206 are modified by the application 122.

However, it is not required that the applications 122 or the network management station engine 203 be aware of a managed device's ability to map a security name/security model combination to multiple groups. Thus in one embodiment, the engine 203 is compliant with an SNMP protocol that allows a security name/security model combination to map to only a single group. In one embodiment, an application is compliant with an SNMP protocol that allows a security name/security model combination to map to only a single group.

The managed devices 126 have stored thereon one or more security to group tables 206 that map a combination of a security name and security model to at least one group name. Furthermore, the managed devices 126 have stored thereon an access table 208 that defines access privileges for each group. The MIS 132 defines the structure for the security to group tables 206 and the access table 208. An exemplary MIS is described herein.

In one embodiment, the managed devices 126 and network management station 120 have processors for implementing the engines (202, 203) and computer readable media for implementing the MISs (132). For example, the security to group tables 206 and access tables 208 may be stored in a computer readable medium that is accessible by the engine 202.

Figure 3A:
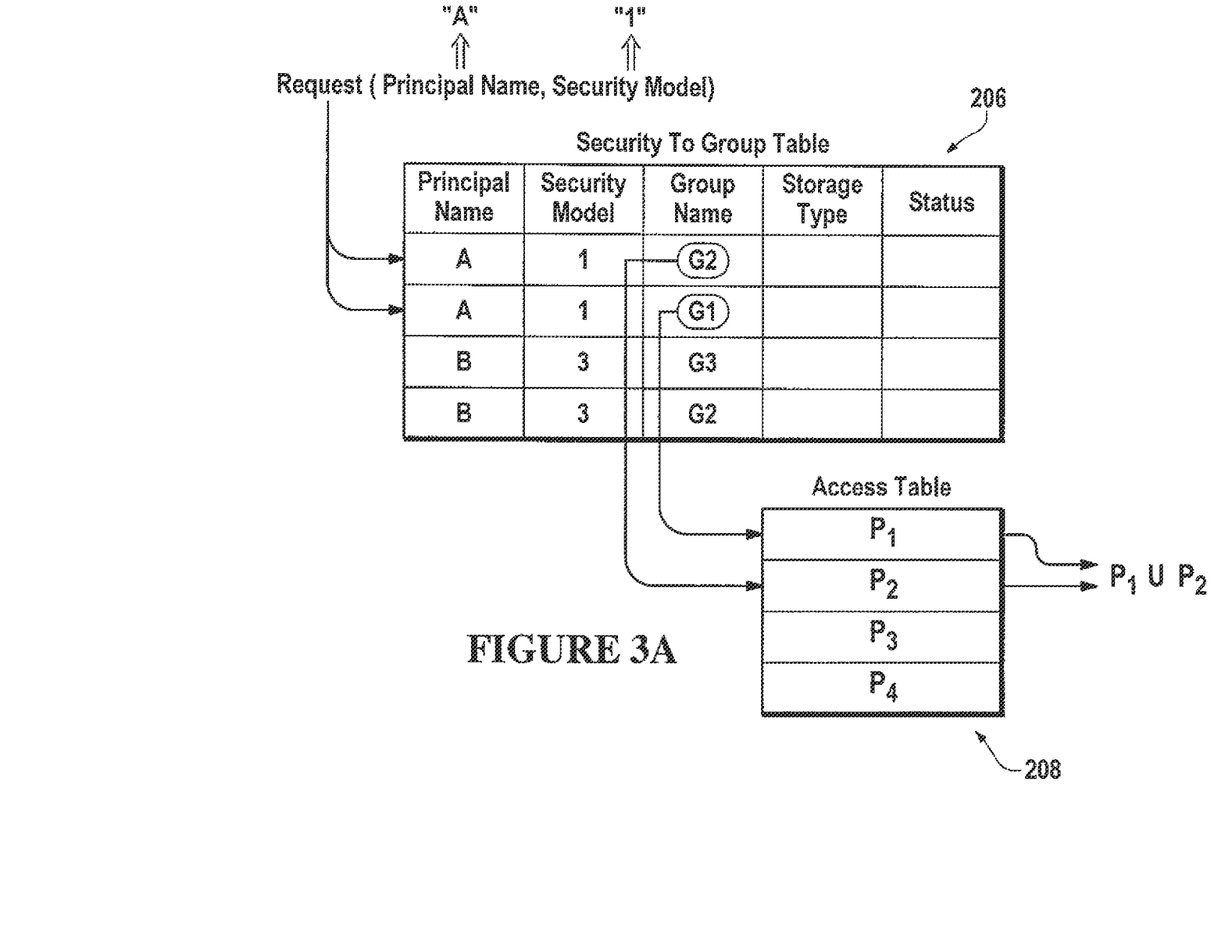
FIG. 3A and FIG. 3B illustrate tables used to determine access privileges in accordance with an embodiment of the present invention.

FIG. 3A illustrates tables used to determine access privileges in accordance with an embodiment of the present invention. In particular, FIG. 3A illustrates access privileges determination for a received request. The request comprises a principal name and a security model, in this embodiment. In one embodiment, the format of the request is compliant with in an SNMP protocol, such as "An Architecture for Describing SNMP Management Frameworks (RFC 3411). However, the request is not limited to this architecture. The security to group table 206 is organized with rows each having an entry for a principal name, a security model, a group name, a storage type, and a status. The security to group table 206 allows a combination of a principal name and a security model to be mapped to multiple groups. In this example, the combination of the principal name of "A" and security model "1" are associated with group names "G 1" and "G2".

The access privileges table 208 contains a row for each group, wherein each group has a defined set of access privileges. In this example, the access privileges table 208 is indexed separately with group G1 and with group G2, wherein the access privileges are the union of the privileges accorded to group G1 and group G2. However, the access privileges do not have to be formed by a logical union. In one embodiment, the access table 208 is compliant with an SNMP protocol. Thus, managed objects may be accessible based on a requesting principal's membership in access groups that are compliant with a Simple Network Management Protocol (SNMP).

Figure 3B:
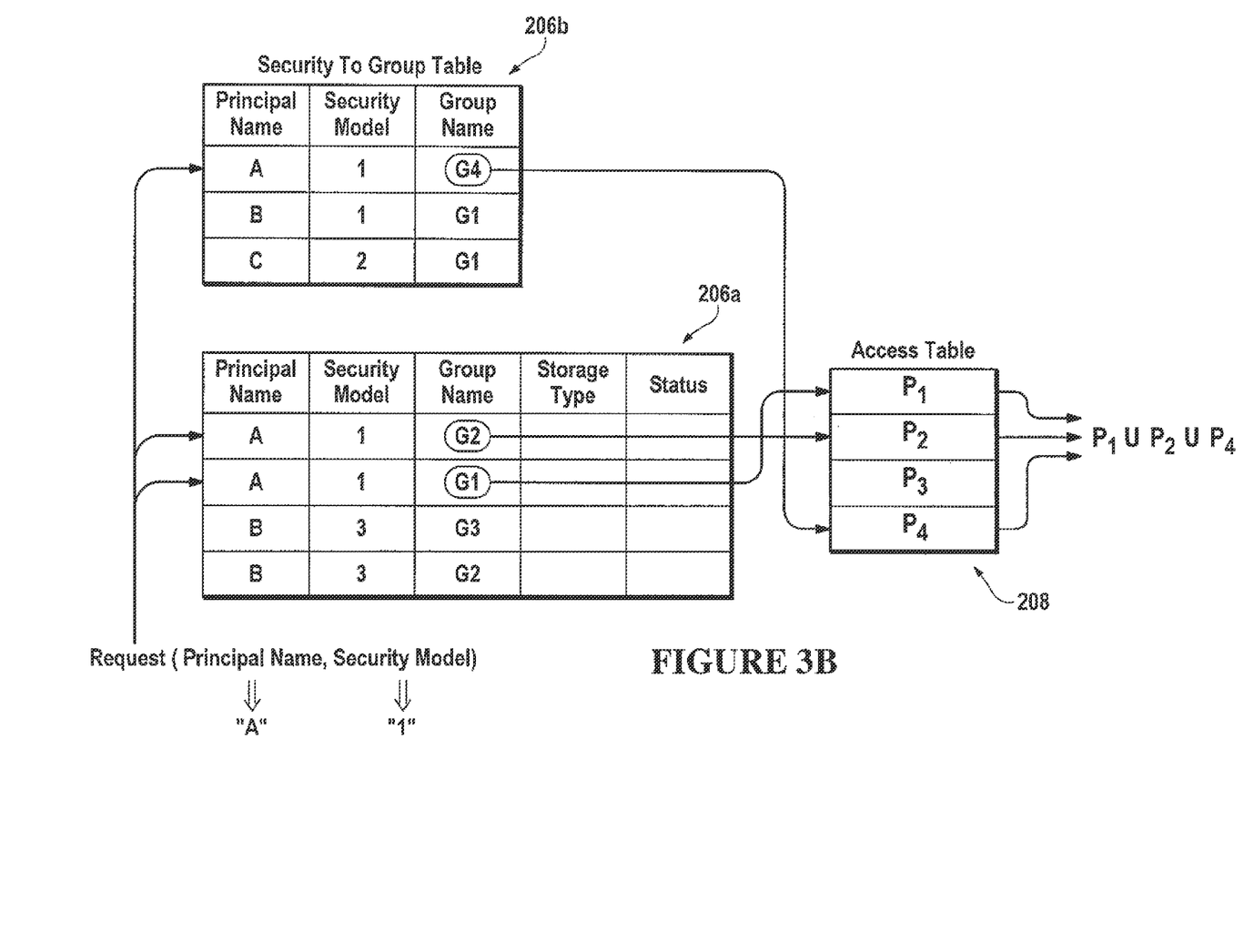

FIG. 3B illustrates tables used to determine access privileges in accordance with an embodiment of the present invention. FIG. 3B illustrates an extended security to group table 206b and an access privilege table 208 that are similar to the tables in FIG. 3A. FIG. 3B also has a basic security to group table 206a that maps a combination of a security name and a security model to only one group. In one embodiment, basic security to group table 206a is compliant with an SNMP protocol. In one embodiment, the group table 206a is compliant with "View-based Access Control Model (VACM) for the Simple Network Management Protocol (SNMP) (RFC 3415). However, the basic security to group table 206a is not limited to this implementation. In the example of FIG. 3B, the combination of the security name "A" and security model "1" are associated with only group name "G4", in the basic security to group table 206a. Furthermore, in this example, the access privileges table 208 is indexed separately with group names "G1", "G2" and "G4," wherein the access privileges are the union of the privileges accorded to groups "G1", "G2" and "G4." However, the access privileges may be formed by other than the union of the privileges accorded to groups "G1", "G2" and "G4."

Table I-Table V define portions of an exemplary MIS that may be used as an extension of a "vacmSecurityToGroupTable" defined in an SNMP protocol, such as RFC 3415. However, the present invention is not limited to this exemplary MIS. Furthermore, the present invention limited to an extension of a "vacmSecurityToGroupTable" defined in an SNMP protocol.

Table I depicts a structure for an exemplary security to group table, "cvacmSecurityToGroupTable", in accordance with an embodiment of the present invention. The cvacmSecurityToGroupTable table depicted in Table I provides a mechanism to map a combination of 'securityModel' and 'securityName' into one or more groups in addition to the 'vacmGroupName' mapped in the 'vacmSecurityToGroupTable' that are defined in an SNMP protocol such as RFC 3415. These groups provided for by the "cvacmSecurityToGroupTable" provide additional access control policies for a principal.

Table I cvacmSecurityToGroupTable OBJECT-TYPE
    SYNTAX SEQUENCE OF CvacmSecurityToGroupEntry
    MAX-ACCESS Not-accessible
    STATUS current In one embodiment, the agent allows the same group mapping entry to be present in both the 'cvacmSecurityToGroupTable' and the vacmSecurityToGroupTables.

A row in the "cvacmSecurityToGroup" table does not exist without a corresponding row for the same combination of "securityModel" and "securityName" in the "vacmSecurityToGroupTable", in one embodiment. While creating a row in the "cvacmSecurityToGroupTable" table, if there is no corresponding row for the same combination of "securityModel" and "securityName" in the "vacmSecurityToGroupTable," the same mapping entry is created in the "vacmSecurityToGroupTable" by the agent using the values of instance variables of the entry in the "cvacmSecurityToGroupTable" table, in one embodiment.

The deletion of a row in the 'vacmSecurityToGroupTable', also causes the deletion of all the group mapping entries for the same combination of 'vacmSequrityModel' and vacmSecurityName' in the 'cvacmSecurityToGroupTable', in one embodiment. The deletion of a row in this table does not affect 'vacmSecurityToGroupTable' entries, in one embodiment. Table II describes a conceptual row "cvacmSecurityToGroupEntry" in the "cvacmSecurityToGroup Table" depicted in Table I herein. Each row represents one groupName mapping for the combination of 'securityModel' and 'securityName' in the system. Further, each row comprises a storage type and row status. Table II describes an index for the "cvacmSecurityToGroupTable," wherein "cvacmSecurityGrpName" is described herein in Table III herein.

Table II cvacmSecurityToGroupEntry OBJECT-TYPE
   SYNTAX cvacmSecurityToGroupEntry
   MAX-ACCESS Not-accessible
   STATUS current
INDEX {vacmSecurityModel,
   vacmSecurityName,
   cvacmSecurityGrpName}
::={cvacmSecurityToGroupTable 1}
CvacmSecurityToGroupEntry::=
SEQUENCE{
   cvacmSecurityGrpName SnmpAdminString,
   cvacmSecurityGrpStorageType Storage Type,
   cvacmSecurityGrpStatus RowStatus
}

Table III depicts a group name "cvacmSecurityGrpName," which is the name of the group for the mapping represented by this row. This is in addition to the 'vacmGroupName' mapped in the 'vacmSecurityToGroupTable'. For example, a principal represented by 'securityName' maps to a group represented by 'cvacmSecurityGrpName' under a security model represented by 'securityModel'. This groupName is used as index into the 'vacmAccessTable' described in RFC 3415, in one embodiment. However, a value in this table does not imply that an instance with the value exists in table 'vacmAccessTable'. Referring to Table II herein, the group name "cvacmSecurityGrpName" is entry 1 in the sequence.

Table III cvacmSecurityGrpName. OBJECT-TYPE
   SYNTAX SnmpAdminString(SIZE1 . . . 32))
   MAX-ACCESS Not-accessible
   STATUS current
::={cvacmSecurityToGroupEntry 1}

Table IV depicts the storage type for a conceptual row. Conceptual rows having the value 'permanent' need not allow write-access to any columnar objects in the row, in one embodiment. Referring to Table II herein, the storage type is entry 2 in the sequence.

Table IV cvacmSecurityGrpStorageType OBJECT-TYPE
   SYNTAX RowStatus
   MAX-ACCESS read-create
   STATUS current
::={cvacmSecurityToGroupEntry 2}

Table V depicts the row status "cvacmSecurityGrpStatus" for a conceptual row. The value of this object has no effect on whether other objects in this conceptual row can be modified, in one embodiment. Referring to Table II herein, the row status is entry 3 in the sequence.

Table V cvacmSecurityGrpStatus OBJECT-TYPE
   SYNTAX RowStatus
   MAX-ACCESS read-create
   STATUS current
::={cvacmSecurityToGroupEntry 3}

Figure 4:
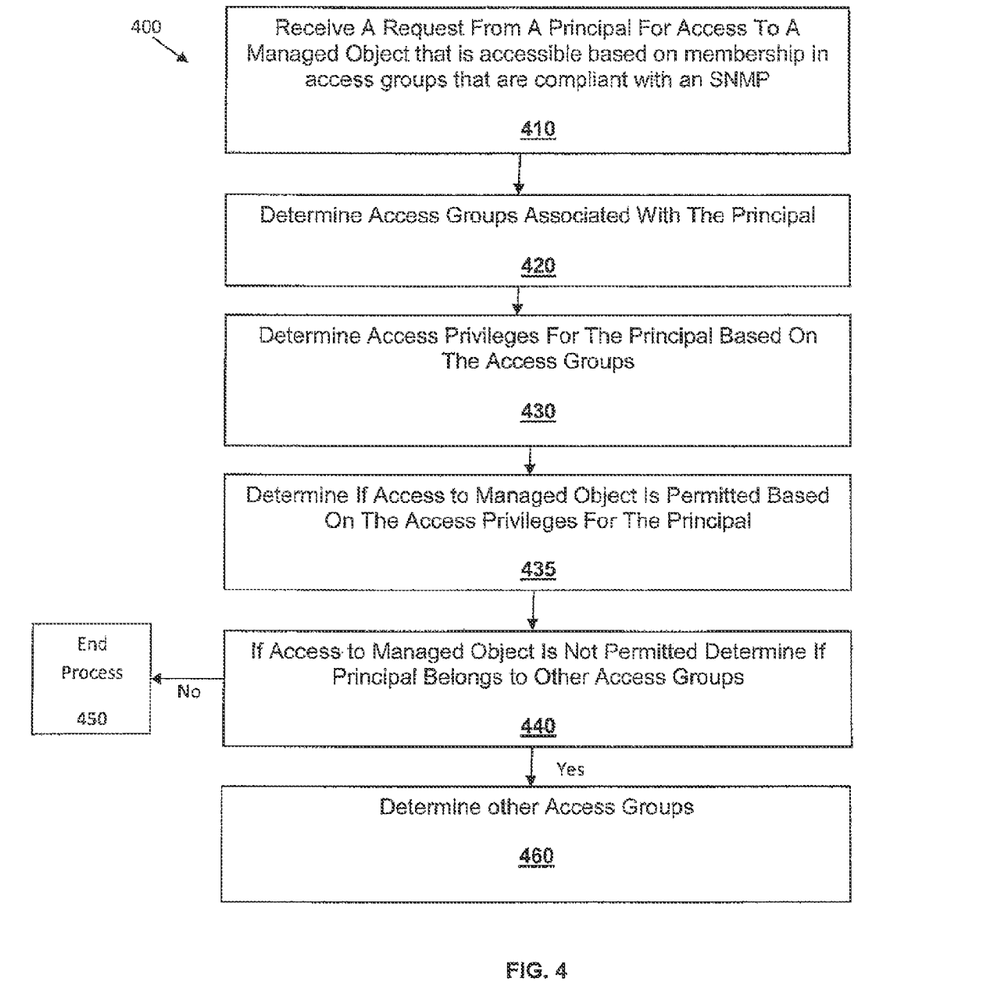
FIG. 4 is a flowchart illustrating steps of a process of controlling access to managed objects in a network device, in accordance with an embodiment of the present invention.

FIG. 4 is a flowchart illustrating steps of a process 400 of controlling access to managed objects in a network device, in accordance with an embodiment of the present invention. Process 400 may be implemented by engine 202 of managed device 126, although process 400 is not so limited. In one embodiment, process 400 is implemented as instructions embedded in a computer readable medium and executed in a processor. However, process 400 may be implemented by hardware or a combination of hardware and software. Step 410 is receiving a request from a principal for access to a managed object associated with the networked device. The managed objects are accessible based on a requesting principal's membership in access groups that are compliant with a Simple Network Management Protocol (SNMP), in one embodiment.

Step 420 is determining a first access group associated with the principal. In one embodiment, step 420 comprises indexing a table that maps a principal name/security model combination to a single access group. However, step 420 is not limited to indexing a table that maps a principal name/security model combination to a single access group.

Step 430 is determining access privileges for the principal based on the presently examined access group. Step 430 may comprise indexing an access table with the group name determined in step 420 (or step 460). In one embodiment, the access table is compliant with an SNMP protocol.

Step 435 is granting access to the m-anaged object if permitted based on the access privileges for the principal.

If access to the managed object is not allowed based on the group, then step 440 is performed to determine of the principal belongs to more access groups. If the principal is not in another access group, access to the managed object is denied in step 450. Process 400 then ends.

If the principal is in another access group, the next access group is determined in step 460. Step 460 may include indexing a table that may map a security name/security model to more than one access group. Process 400 then returns to step 430 to determine if access to the managed object is allowed for this access group. Process 400 continues until either access is granted or there are no more access groups for the principal.

SNMP groups may roughly map to Command Line Interface (eLi) "roles." Generally, it is possible to associate multiple roles with a CLI principal (e.g., user, application). However, a conventional SNMP protocol does not allow association of multiple groups with a single principal (e.g., user, principal). Embodiments of the present invention allow a single principal to be associated with multiple groups. Hence, an embodiment of the present invention allows groups to be aligned with CLI roles, enabling a unified security model.

Table VI depicts how allowing users to be assigned to multiple groups allows a unified security model, in accordance with an embodiment of the present invention. The CLI users U1, U2, and U3 might be assigned roles R1-R5 as depicted. Embodiments of the present invention allow alignment of the user roles to SNMP groups, wherein the user is assigned to SNMP groups that are analogous to CLI roles. Therefore, users U1-U3 are assigned to groups G1-G5, wherein groups G1-G5 are similar in functionality as their corresponding roles R1-R5 in CLI.

TABLE-US-00006 TABLE VI User CLI Role SNMP Group U1 R1, R2, R5 G1, G2, G5 U2 R1, R3 G1, G3 U3 R2, R3, R4 G2, G3, G4

The foregoing descriptions of specific embodiments of the present invention have been presented for purposes of illustration and description. They are not intended to be exhaustive or to limit the invention to the precise forms disclosed. Many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A network management device comprising: a network management engine configured to send a request for access to managed objects defined in a management information base associated with a remote managed device, wherein the request indicates a principal is a member of at least one of a plurality of access groups compliant with a Simple Network Management Protocol (SNMP), wherein each of the plurality access groups defines a set of access privileges, wherein access to the managed objects is based on membership in at least one of the plurality of access groups; wherein the network management engine is aware that the remote managed device is compliant with SNMP and not aware that the remote managed device is configured to perform access control based on roles in accordance with a Role-Based Command Line Interface (CLI) Access protocol by aligning SNMP compliant access groups with corresponding roles of the Role-Based CLI Access protocol.

2. The network management device of claim 1, wherein the management node issues a request on behalf of a principal belonging to a first and a second of the plurality of access groups.

3. The network management device of claim 1, further comprising a command generator module configured to initiate a request to add or delete the principal name to or from at least one of the plurality of access groups.

4. The network management device of claim 3, wherein the command module is configured to modify a security to group table stored in a management information base associated with a network device managed by the network management device.

5. The network management device of claim 1, wherein the network management engine is not aware that the managed device is configured to map information associated with the principal to multiple access groups of the plurality of access groups.

6. The network management device of claim 1, wherein the alignment corresponds to a unified security model.

* * * * *